Patented Feb. 16, 1926.

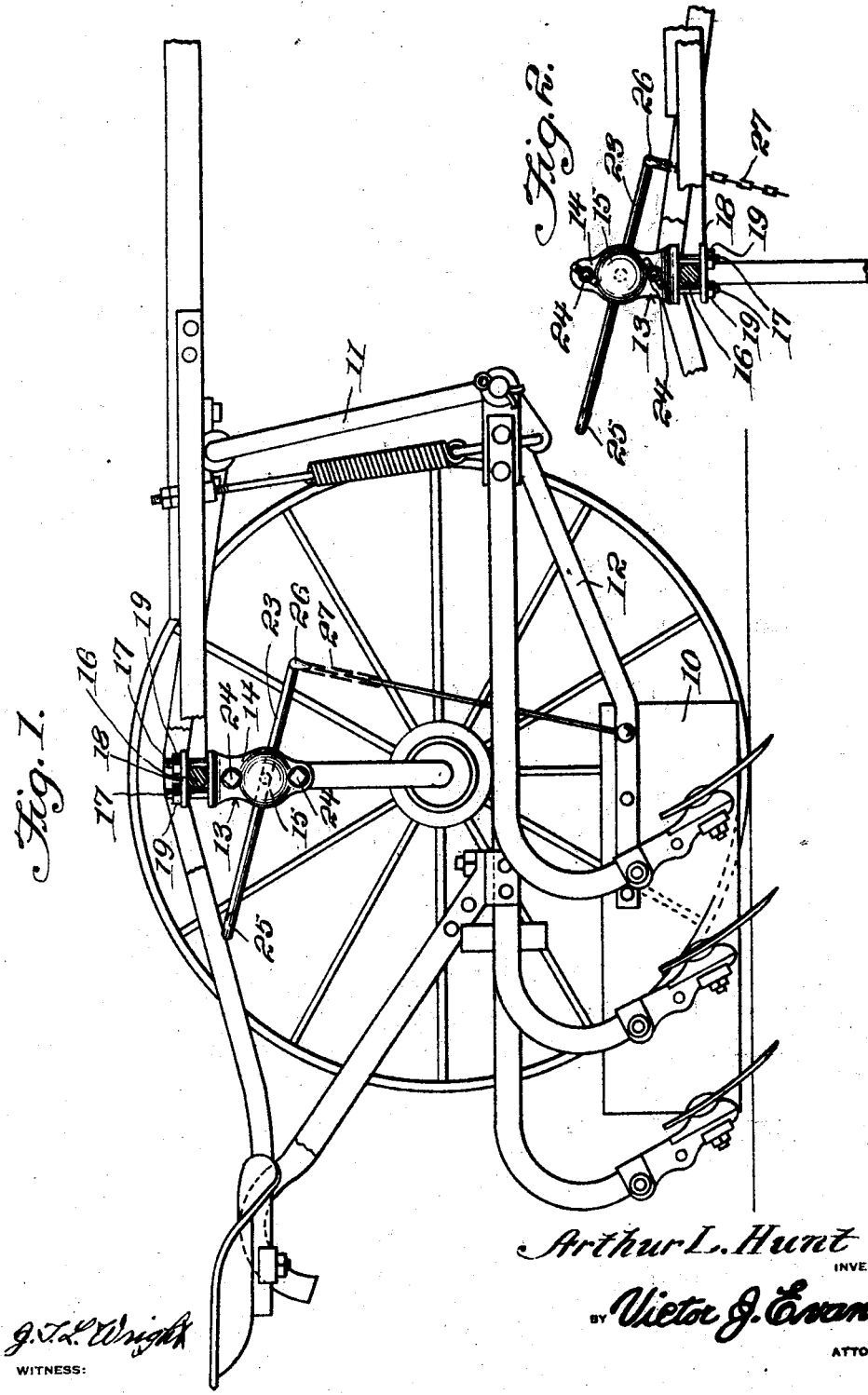

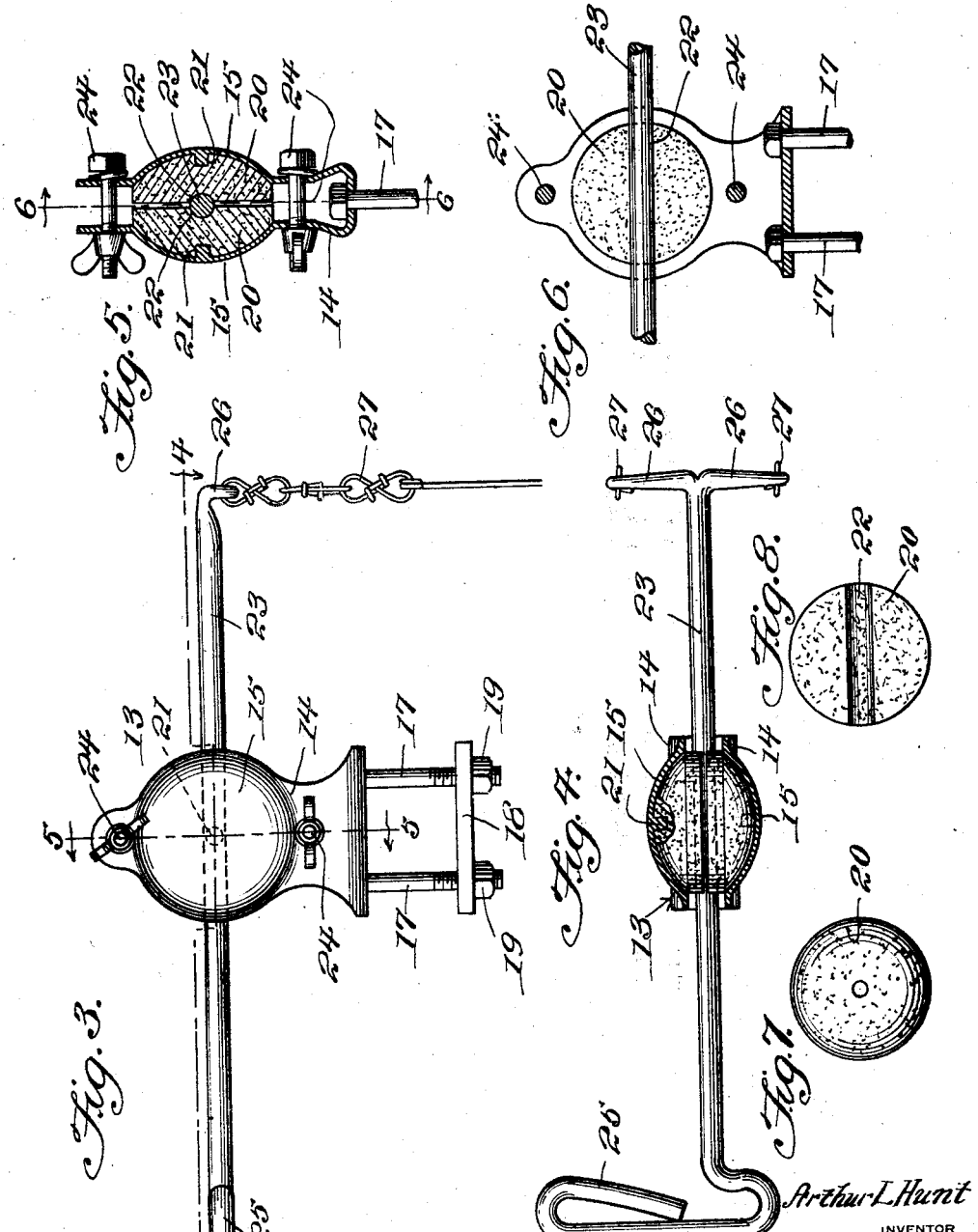

1,573,712

UNITED STATES PATENT OFFICE.

ARTHUR L. HUNT, OF RAVENWOOD, MISSOURI.

FENDER CONTROL.

Application filed November 8, 1924. Serial No. 748,728.

*To all whom it may concern:*

Be it known that I, ARTHUR L. HUNT, a citizen of the United States, residing at Ravenwood, in the county of Nodaway and State of Missouri, have invented new and useful Improvements in Fender Controls, of which the following is a specification.

This invention relates to improvements in agricultural machines and has especial relation to fenders for cultivators and the like, an object being to provide means whereby the fenders may be adjustably regulated in accordance with the character of the work.

Another object of the invention is the provision of a fender regulating means which may be adjustably secured in place and arranged for convenient manipulation by the operator of the cultivator, so that the fenders may be easily and quickly adjusted during the operation of cultivating or plowing.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view illustrating a cultivator with the invention applied.

Figure 2 is a fragmentary section showing a different position of the adjusting rod.

Figure 3 is an enlarged elevation of the invention per se.

Figure 4 is a section on the line 4—4 of Figure 3.

Figure 5 is a section on the line 5—5 of Figure 3.

Figure 6 is a section on the line 6—6 of Figure 5.

Figures 7 and 8 are opposite face views of one of the bearing blocks.

Referring to the drawings in detail wherein like characters of reference denote corresponding parts, the fenders which are indicated at 10 may be attached to the cultivator by any suitable means, such as a pivotally mounted arm or arms 11 which are in turn pivotally connected to arms 12, the latter being rigid with the fenders 10.

The invention which is designed to provide means for adjusting the position of the fenders 10, includes a bearing bracket 13. This bracket comprises a substantially U-shaped clamping member 14 which includes spaced arms, the latter being provided with oppositely located opposed sockets 15. The U-shaped bracket 14 is adapted to be adjustably mounted upon the axle 16 or other convenient portion of the cultivator and for this purpose has extending therefrom spaced bolts 17. These bolts are connected by a bar 18 and have mounted thereon nuts 19 so that the bracket 13 may be attached to the axle either below the latter as shown in Figure 1 or above said axle as shown in Figure 2.

The sockets 15 of the bearing bracket have located therein bearing blocks 20 which may be formed of any suitable material such as wood, wood fiber or metal and these blocks are provided with sockets for the reception of trunnions 21 which are located within the sockets 15 of the bracket 14. This provides means to permit of rotary movement of the blocks 20. The blocks are further provided in their opposed faces with oppositely located grooves 22 and these grooves are adapted to receive an adjusting rod 23. In order to hold the rod in position there is provided clamping bolts 24 which extend through the bracket upon opposite sides of the blocks 20 so that the said U-shaped member or bracket 14 defines a clamp which may be adjusted to tightly engage the rod 23. By this means the rod may be longitudinally adjusted so that its handle end or grip 25 may be within convenient reach of the operator of the cultivator, while the said rod 23 may be also pivotally adjusted through the rotary movement of the block 20. The spaced arms of the clamping member 14 are formed of resilient or spring metal so that the rod 23 may be adjusted for the purpose of adjusting the fenders 10 without moving the thumb nuts of the bolts 24.

The outer end of the rod 23 is provided with oppositely extending arms 26 and the latter have a flexible connection 27 with the fenders 10. By moving the rod pivotally, the position of the fenders may be easily and quickly regulated without the necessity of stopping the cultivator.

In addition, the invention may be easily and quickly applied to a cultivator without the use of special tools and without making changes in the cultivator construction.

The invention is susceptible of various changes in its form, proportions and minor details of construction and the right is herein reserved to make such changes as properly fall within the scope of the appended claims.

Having described the invention what is claimed is:—

1. The combination with a cultivator and fenders adjustably secured thereto, of an adjusting rod, means connecting said rod and fenders, a substantially U-shaped bracket, means whereby the bracket may be secured to the cultivator, opposed pivotally movable bearing blocks carried by the bracket for engagement with the rod, means to releasably clamp the blocks in engagement with the rod to adjust the rod longitudinally and means providing an engagement between the bracket and blocks whereby the latter may be moved pivotally to regulate the position of the fenders.

2. The combination with a cultivator and fenders adjustably secured thereto, of an adjusting rod, means connecting said rod and fenders, a substantially U-shaped bearing member including spaced arms having opposed sockets therein, bearing blocks arranged within the sockets, trunnions located within the sockets and engaging the blocks to permit of pivotal movement, the opposed faces of the blocks having oppositely located grooves therein to receive the rod in a manner to permit of longitudinal adjustment of said rod, means adjustably connecting the arms to clamp the rod in position and means whereby the bearing members may be secured to the cultivator.

In testimony whereof I affix my signature.

ARTHUR L. HUNT.